United States Patent [19]
Diekevers

[11] Patent Number: 5,553,931
[45] Date of Patent: Sep. 10, 1996

[54] TRACK ROLLER ASSEMBLY

[75] Inventor: Mark S. Diekevers, East Peoria, Ill.

[73] Assignee: Caterpillar Inc., Peoria, Ill.

[21] Appl. No.: 356,943

[22] Filed: Dec. 15, 1994

[51] Int. Cl.$^6$ .................................................. B62D 55/15
[52] U.S. Cl. .................... 305/100; 305/124; 305/193
[58] Field of Search .......................... 305/11, 14, 56, 305/57, 21, 24, 28

[56] References Cited

U.S. PATENT DOCUMENTS

| | | | |
|---|---|---|---|
| 2,647,025 | 7/1953 | Deffenbaugh | 308/187 |
| 3,154,958 | 11/1964 | Cadwell et al. | 74/230 |
| 3,241,843 | 3/1966 | Hatch et al. | 305/11 |
| 3,910,128 | 10/1975 | Boggs et al. | 74/230.01 |
| 3,917,362 | 11/1975 | Stedman | 308/20 |
| 4,189,159 | 2/1980 | Domes et al. | 305/11 X |
| 4,428,589 | 1/1984 | Reinsara | 305/11 X |
| 5,302,012 | 4/1994 | Dester et al. | 305/56 |

*Primary Examiner*—Russell D. Stormer
*Attorney, Agent, or Firm*—Claude F. White

[57] ABSTRACT

A track roller assembly for guiding an endless track includes a central supporting shaft, a roller shell having a through bore, a pair of bushings surrounding the shaft and positioned within the roller through bore, and a pair of split rings which secure the roller shell in a fixed position with respect to the bushings and the shaft. A seal assembly at each end of the through bore seals in lubricating fluid and seals out dirt and other harmful matter. The split rings hold the shaft, bushings, and roller shell together and eliminate threaded fasteners which reduce the useful wear life of the roller shells. Resilient load rings in the seal assemblies provide proper loading of the seal assemblies and prevent dirt from eroding the load rings.

15 Claims, 3 Drawing Sheets

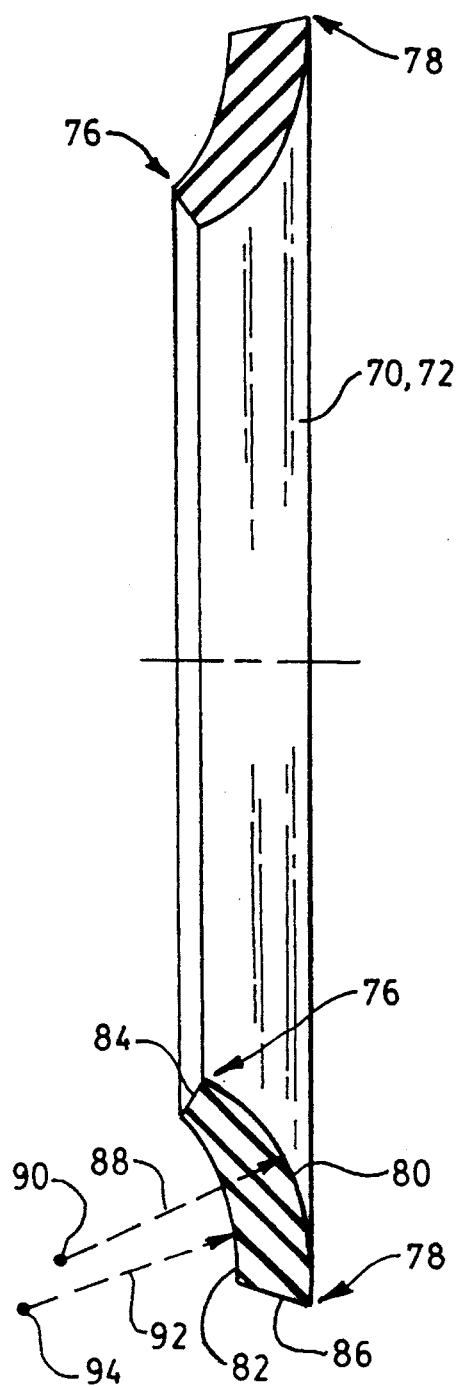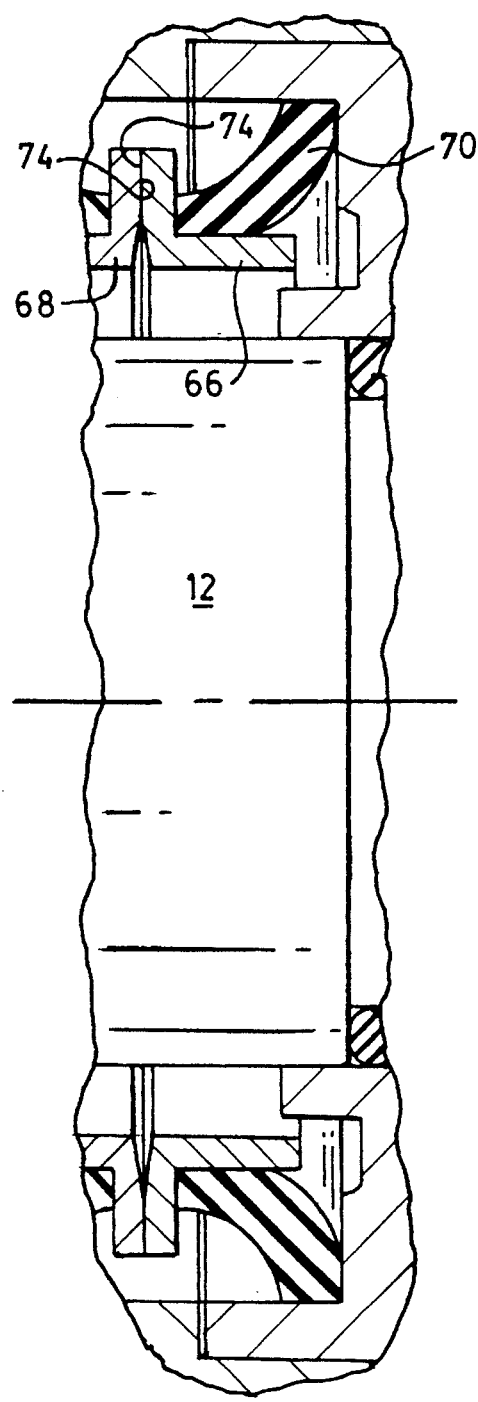

TRACK ROLLER ASSEMBLY

TECHNICAL FIELD

This invention relates generally to a track roller assembly for supporting and guiding the endless track of a track-type machine and more particularly to an arrangement of split metal rings which secure the roller shell of the track roller assembly in a fixed axial position with respect to the bushing and shaft of the assembly.

BACKGROUND ART

Self-laying track-type work machines utilize an endless track chain assembly joined together by interconnected link arrangements. The link arrangements include overlapping link members which form a pair of continuous rails. A plurality of track roller assemblies bear the weight of the machine, and guide the track chain by engaging the link rails as the track chain rotates about a drive sprocket wheel and one or more idler wheels. The roller assemblies rotate from frictional engagement with the moving link rails. The continuous contact between the rails and the roller treads produces wear of the two components with resulting replacement or repair. Such replacement or repair increases the operating cost and downtime of the machine. If the useable wear life of the roller treads can be extended, the overall value and service of the machine is increased.

One method of extending the useful life of the roller treads have been proposed, which includes providing replaceable wear members for the roller tread portion. One type of track roller assembly having replaceable roller tread portions is disclosed in U.S. Pat. No. 3,910,128, issued on Oct. 7, 1975 to R. L. Boggs et al. The tread portion of this roller assembly includes an inner resilient collar and an outer metallic ring. The tread portions are held between a pair of flanges and the flanges are secured in place by threaded retaining means. This particular arrangement would appear to function satisfactorily for its intended purpose. However, this assembly contains a considerable number of parts and requires time and effort to assemble the parts together.

Another type of track roller assembly having a tread portion separate from the roller shell is disclosed in U.S. Pat. No. 3,154,958, issued Nov. 3, 1964 to W. C. Codwell et al. The separate tread portions are pressfitted to the roller shell, or hub, and are held against axial movement by split expansion rings. Two part bushings, between the roller shell and the shaft, are secured to the roller shell by a plurality of bolts which thread into the roller shell. Although this roller assembly would appear to function in a satisfactory manner, the amount of useable wear life of the tread portions is somewhat limited. Replacement of the tread portions would cause downtime of the machine.

The present invention is directed to overcoming one or more of the problems as set forth above.

DISCLOSURE OF THE INVENTION

In one aspect of the invention, a track roller assembly for guiding the track of a track type machine includes a central supporting shaft, first and second bushings positioned on opposite ends of the shaft, a roller shell having first and second tread portions and an internal bore which accommodates the shaft and bushings, and first and second split retaining rings positioned in the bore and against the bushings. The track roller assembly further includes an end cap substantially closing each end of the internal bore and a seal assembly positioned between each end cap and each bushing.

Continuous frictional rolling contact between the metal link rails and the metal roller treads of endless track assemblies produces wear of the rails and roller treads. The wear life of the roller treads can be extended if additional wear material is provided in the area of the roller treads. Additionally, the life of the entire track roller assembly can be prolonged by excluding dirt and foreign material from the internal bore and retaining lubricating fluid within the internal bore.

The subject track roller assembly extends the wear life of the roller treads by eliminating bolt holes in the roller body below the roller treads. This allows the roller treads to wear deeper into the roller body without weakening the roller shell. The roller shell is also easily assembled to the shaft and bushings and held against axial movement by split metal rings in the bore of the roller shell. The non circular load rings of the seal assemblies apply sufficient load to the metal seal rings and prevents dirt from lodging between the load rings and the end caps, or between the loadring and the seal rings.

BRIEF DESCRIPTION OF THE DRAWINGS

FIG. 2 is an enlarged diagrammatic view, partially in section, of a portion of one of the seal assemblies of the present invention;

FIG. 3 is an enlarged diagrammatic sectional view of a loadring of the present invention.

BEST MODE FOR CARRYING OUT THE INVENTION

Figure 1:
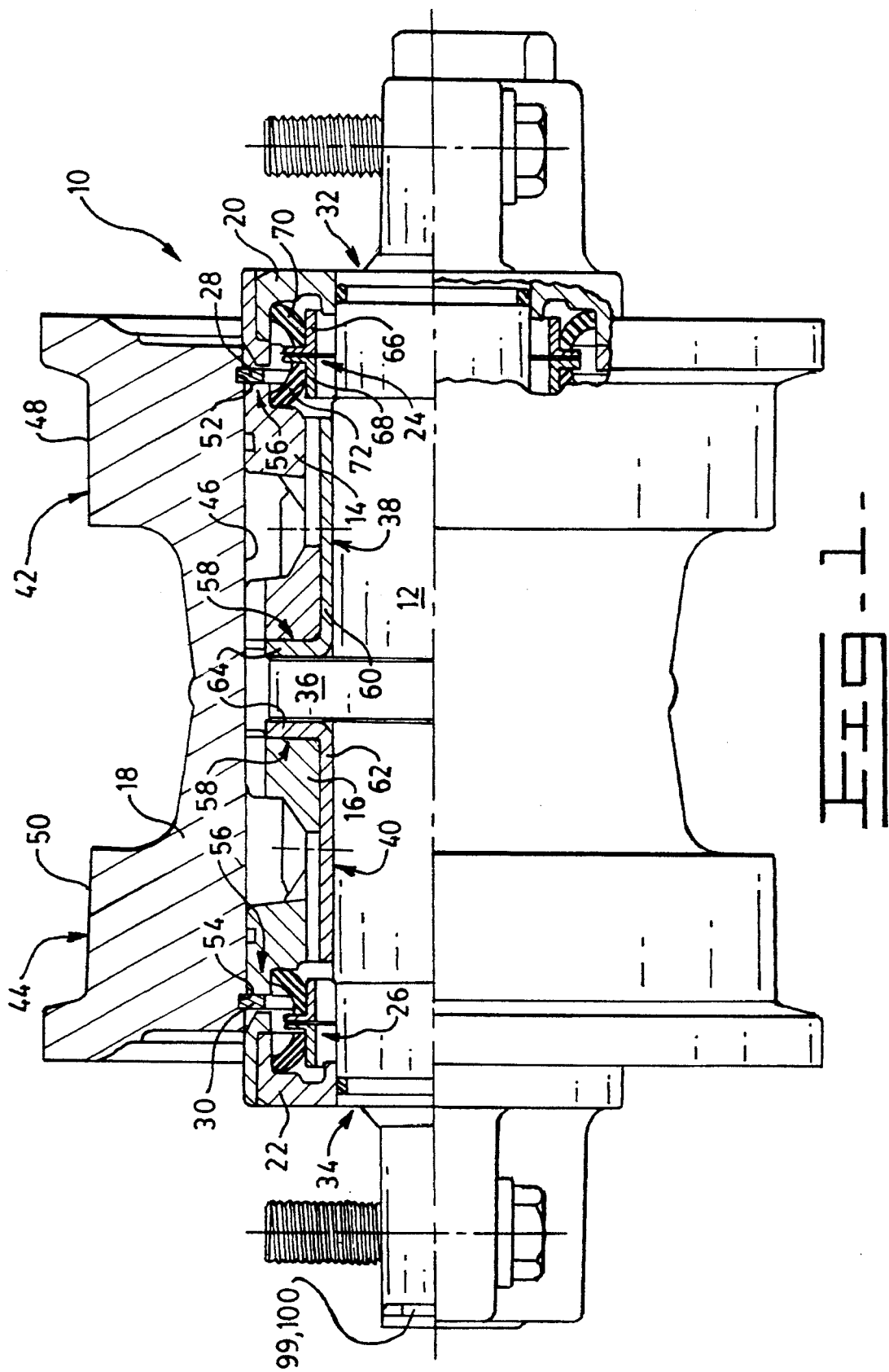
FIG. 1 is a diagrammatic view, partially in section, of a track roller assembly incorporating the subject invention.

With reference to the drawings, a track roller assembly 10 for guiding the track (not shown) of a track-type machine (not shown) includes a central supporting shaft 12, first and second bushings 14,16, a roller shell 18, first and second end caps 20,22, first and second seal assemblies 24,26, and first and second split metal retaining rings 28,30 which secure the roller shell 18 in a fixed position with respect to the bushings 14,16 and the shaft 12. The first and second end caps 20,22 are preferably slipfitted to the shaft 12 and held in place by split lock rings 99 and 100 and the first and second bushings 14,16 are preferably pressfitted to the roller shell 18. The supporting shaft 12 has first and second end portions 32,34, a central flange portion 36, and first and second bushing supporting portions 38,40 which are positioned respectively between the central flange portion 36 and the first and second end portions 32,34. The first and second bushings 14,16 are positioned on respective first and second bushing supporting portions 38,40 of the supporting shaft 12.

The roller shell 18 has first and second tread portions 42,44 and an internal through bore 46 with the supporting shaft 12 and bushings 14,16 being adapted to fit within the bore 46. The tread portions 42,44 have respective contact surfaces 48,50 which are adapted to contact the endless track (not shown) of the track-type machine (not shown). During operation of the machine and motion of the endless track, and over extended periods of time, the contact surfaces 48,50 erode from the contact with the endless track.

The first and second end caps 20,22 are positioned on respective first and second shaft end portions 32,34 and substantially close off each end of the internal bore 46. The first and second seal assemblies 24,26 are positioned between respective first and second bushings 14,16 and first and second end caps 20,22. The seal assemblies 24,26 prevent leakage of lubricating fluid out of the internal bose 46 and prevent dirt and other foreign material from entering the internal bore 46.

The track roller shell 18 has first and second circular grooves 52,54 formed in the internal bore 46 and the split retaining rings 28,30 are adapted to fit within respective grooves 52,54. Each of the bushings 14,16 has first and second end portions 56,58 with the first end portions 56 being adapted to contact one of the split rings 28,30 and the second end portions 58 being adapted to contact the central flange portion 36 of the supporting shaft 12. The track roller assembly 10 further includes first and second bearing sleeves 60,62, with each sleeve 60,62 having a radially extending flange portion 64. The bearing sleeves 60,62 are positioned between the respective first and second bushing supporting portions 38,40 and the first and second bushings 14,16. The flange portion 64 of each sleeve 60,62 is positioned between the central flange portion 36 of the shaft 12 and the second end portion 58 of one of the bushings 14,16.

Each of the seal assemblies 24,26 includes first and second metal seal rings 66,68 and first and second resilient load rings 70,72. The seal rings 66,68 are substantially similar with each seal ring 66,68 having a seal face 74 which mates with a like seal face 74 on a mating seal ring 66,68 in the assembled condition of the seal assembly 24,26. The resilient load rings 70,72 are also substantially similar and are adapted to apply a force to the seal rings 66,68 and the seal faces 74.

With particular reference to FIGS. 2 and 3, each of the resilient load rings 70,72 is cup-shaped and is columnar in cross-section. The cross-sectional shape of each load ring 70,72 includes first and second end portions 76,78 and defines a first curved convex surface 80, an opposed second concave surface 82, a first straight surface 84 joining the first convex surface 80 to the second concave surface 82 at the first end portion 76, and a second straight surface 86 joining the first convex surface 80 to the second concave surface 82 at the second end portion 78. The length of the second straight surface 86 is substantially greater than the length of said first straight surface 84. The first convex surface 80 is defined by a first radius 88 having a first centerpoint 90, and the second concave surface 82 is defined by a second radius 92 having a second centerpoint 94. The first centerpoint 90 is spaced from the second centerpoint 94 and the second radius 92 is greater than the first radius 88.

In the assembled condition of the seal assemblies 24,26, the first end portion 76 of each resilient load ring 70,72 is adapted to contact one of the seal rings 66,68 and the second end portion 78 of each resilient load ring is adapted to contact one of the bushings 14,16 or one of the end caps 20,22. In the assembled condition of the seal assemblies 24,26, wherein the first end portion 76 of the load rings 70,72 is urged toward the second end portion 78, the load rings 70,72 are adapted to flex in a direction toward the convex surface 80, which is toward the sealed interior 96 of the roller assembly 10 and away from the exterior environment 98. The load rings 70,72 will also flex toward the convex surface in response to forces tending to urge the first and second end portions 76,78 toward one another. In view of this, the convex surface 80 never rolls on a contaminated or dirt covered surface and the life of the load rings 70,72 is extended.

Figure 4:
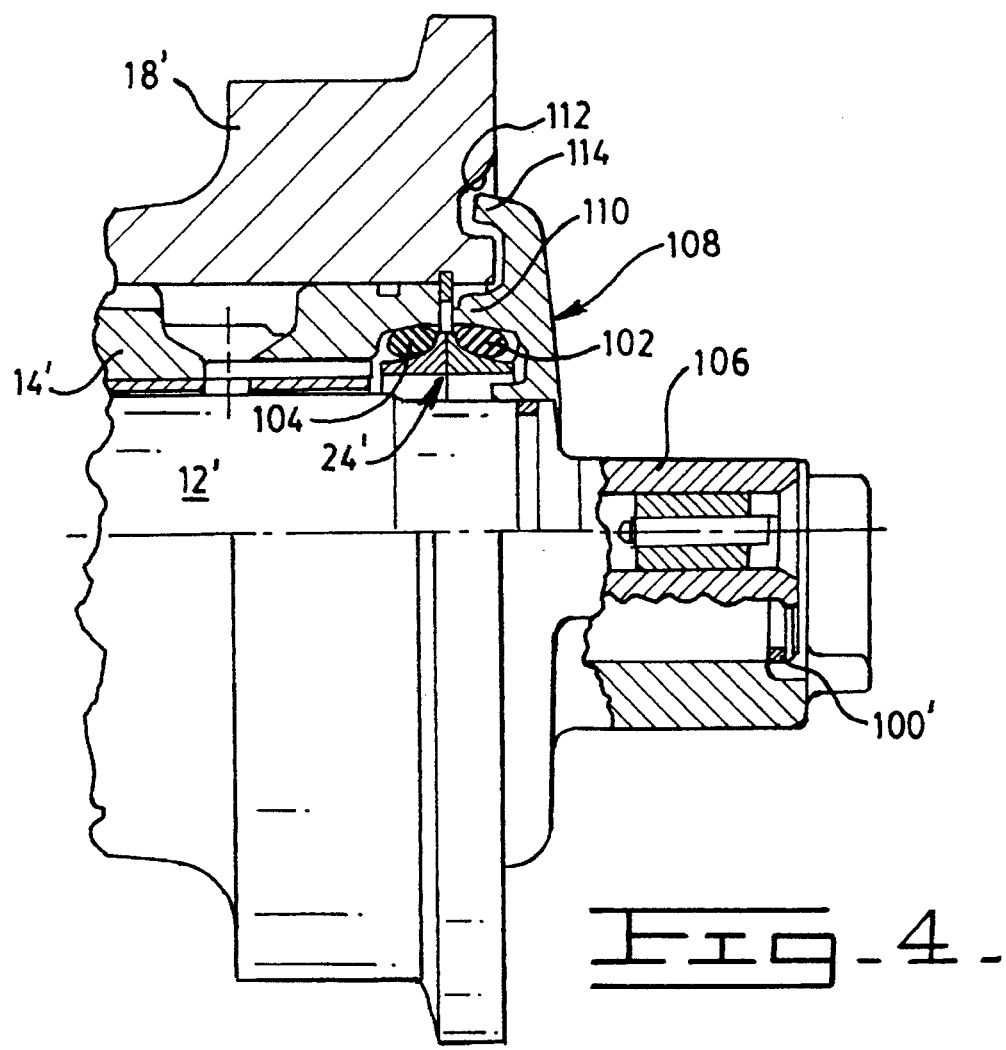
FIG. 4 is a diagrammatic view, partially in section, of a portion of an alternate embodiment of a track roller incorporating the subject invention.
Figure 5:
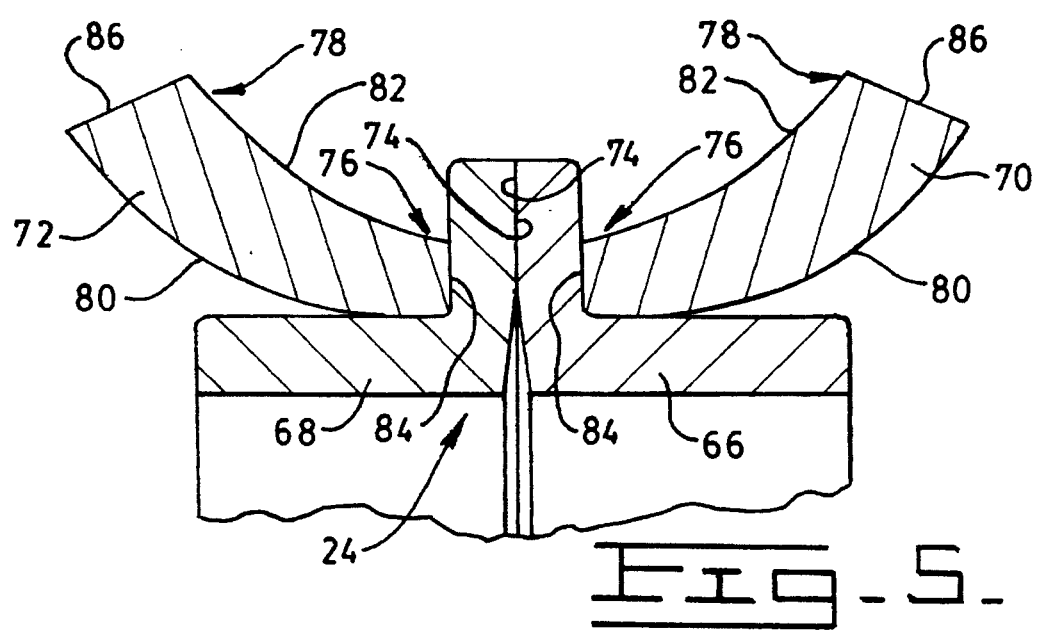
FIG. 5 is a diagrammatic sectional view, on an enlarged scale, of the upper portion of a seal assembly of the present invention.

With particular reference to FIG. 4, an alternate embodiment of a track roller assembly is shown which is similar to the previously described embodiment. In this alternate embodiment, similar elements are indicated by the same reference numerals with a prime symbol. This embodiment incorporates a seal assembly 24' having third and fourth seal rings 66',68' and third and fourth resilient load ring 102,104. The load rings 102,104 are in the form of a torus in the uncompressed state, and somewhat flattened in the installed position. As in the previous embodiment, the bushing 14' and the roller shell 18' are held together by a split retaining ring 28'. The end cap 106 is slipfitted to the supporting shaft 12' and is held to the shaft 12' by a split lock ring 100'. The end cap 106 includes a flange portion 108 which has a loading portion 110 for applying a load to the resilient load ring 102. The roller shell 18' has a recessed portion 112 which accommodates an extension 114 of the flange portion 108.

INDUSTRIAL APPLICABILITY

With reference to the drawings, and the previous detailed description, the subject track roller assembly 10 is particularly useful for guiding the endless track chain of a track-type machine and for increasing the useful life of the roller assembly 10. The life of the roller assembly 10 is increased in view of additional strength of the roller shell 18 and in view of additional wear material in the tread portions 42,44. The resilient load rings 70,72 of the seal assemblies also contribute to increased wear life of the roller assembly 10 by excluding dirt from the interior of the roller assembly 10. The resilient load rings 70,72 are not eroded by dirt and debris because during compression the load rings 70,72 do not roll on contaminated surfaces.

Prior art roller assemblies generally utilize roller shells having threaded holes in the body of the roller shells, immediately below the tread portions, which receive threaded fasteners to secure the bushings and/or other components to the roller shells. Such threaded holes in the body of the roller shells reduce the strength of the shells and reduce the amount of useful wear material of the tread portions. The subject track roller assembly 10 eliminates such threaded holes and utilize split retaining rings 28,30 to secure the bushings 14,16 and the roller shell 18 together.

Other aspects, objects and advantages of this invention can be obtained from a study of the drawings, the disclosure and the appended claims.

I claim:

1. A track roller assembly for guiding the track of a track-type machine, said roller assembly comprising:

a central supporting shaft having first and second end portions, a central flange portion, and first and second bushing supporting portions positioned respectively between said central flange portion and said first and second end portions;

first and second bushings positioned on respective first and second bushing supporting portions of said supporting shaft;

a roller shell having first and second tread portions and an internal bore, said shaft and said bushings being adapted to fit within said bore, first and second end caps positioned on respective first and second shaft end portions, said end caps substantially closing said internal bore;

first and second seal assemblies positioned between respective first and second bushings and said end caps; and first and second split retaining rings adapted to secure said roller shell in a fixed position with respect to said bushings and said shaft.

2. A track roller assembly, as set forth in claim 1, wherein said roller shell includes first and second grooves formed in said internal bore and said split rings are adapted to fit within respective grooves.

3. A track roller assembly, as set forth in claim 2, wherein each of said bushings has first and second end portions and one of said split rings is adapted to contact said first end portion of each bushing.

4. A track roller assembly, as set forth in claim 1, wherein each of said bushing has first and second end portions, said first end portion being adapted to contact one of said split rings and said second end portions being adapted to contact said central flange portion.

5. A track roller assembly, as set forth in claim 1, including first and second bearing sleeves, said sleeves being adapted to be positioned between respective first and second bushing supporting portions and said first and second bushings.

6. A track roller assembly, as set forth in claim 5, wherein each of said bearing sleeves includes a flange portion adapted to be positioned between said central flange portion of said shaft and said second end portion of one of said bushings.

7. A track roller assembly, as set forth in claim 1, wherein each of said seal assemblies includes first and second metal seal rings and first and second resilient load rings, said seal rings having mating seal faces and said load rings being adapted to apply a force to said seal rings and to said seal faces.

8. A track roller assembly, as set forth in claim 7, wherein each of said load rings is cup-shaped and columnar in cross-section; said cross-sectional shape having first and second end portions and defining a first curved convex surface, an opposed second concave surface, a first straight surface joining the first convex surface to the second concave surface at the first end portion, and a second straight surface joining the first convex surface to the second concave surface at the second end portion, the length of said second straight surface being substantially greater than the length of said first straight surface.

9. A track roller assembly, as set forth in claim 8, wherein the first convex surface is defined by a first radius and the second concave surface is defined by a second radius, said second radius being greater than said first radius.

10. A track roller assembly, as set forth in claim 9, wherein said first radius has a first centerpoint and said second radius has a second centerpoint which is spaced from said first centerpoint.

11. A track roller assembly, as set forth in claim 8, wherein said first end portion of each load ring is adapted to contact one of said seal rings and said second end portion of each load ring is adapted to contact one of said bushings and said end caps.

12. A track roller assembly, as set forth in claim 8, wherein said first end portion of each load ring is adapted to flex in a direction toward said concave surface in response to forces urging said first and second end portions toward one another.

13. A track roller assembly, as set forth in claim 1, wherein said end caps are slipfitted to said shaft and secured by split lock rings.

14. A track roller assembly, as set forth in claim 1, wherein said first and second bushings are pressfitted to said roller shell.

15. A track roller assembly, as set forth in claim 7, wherein each of said load rings is a circular ring and is torus shaped in cross-section.

* * * * *